(12) United States Patent
Moriya et al.

(10) Patent No.: US 6,571,060 B2
(45) Date of Patent: May 27, 2003

(54) DRIVING MECHANISM OF OPTICAL DEVICE

(75) Inventors: Masami Moriya, Kawasaki (JP); Takashi Matsubara, Yokosuka (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/768,266

(22) Filed: Jan. 25, 2001

(65) Prior Publication Data

US 2002/0018650 A1 Feb. 14, 2002

(30) Foreign Application Priority Data

Jan. 26, 2000 (JP) .................................... 2000-016621
Jan. 23, 2001 (JP) .................................... 2001-014395

(51) Int. Cl.[7] ............................. G02B 7/04; G16H 1/20
(52) U.S. Cl. ..................................... 396/144; 74/421 A
(58) Field of Search ........................... 396/144, 387, 396/411; 74/421 A; 403/373

(56) References Cited

U.S. PATENT DOCUMENTS 4,110,054 A * 8/1978 Moeller, Jr. ................ 403/373
5,657,666 A * 8/1997 Tsuda et al. ............... 74/421 A

* cited by examiner

Primary Examiner—Russell Adams
Assistant Examiner—Arthur A Smith
(74) Attorney, Agent, or Firm—Oliff & Berridge, PLC

(57) ABSTRACT

In a driving mechanism of an optical device that communicates the motive power generated at a drive source to an object to be driven by employing a plurality of gears, the plurality of gears are each constituted by using, at least, one of; polyester, polyamide and polyacetals. The plurality of gears include a gear having a low bending elastic modulus set to 10 kgf/mm$^2$ or higher and 100 kgf/mm$^2$ or lower and a gear having a high bending elastic modulus set to 50 kgf/mm$^2$ or higher and 1000 kgf/mm$^2$ or lower that meshes with the gear having the low bending elastic modulus, and thus, it becomes possible to reduce the noise generated at the gear meshing portion without compromising the durability of the gears.

6 Claims, 5 Drawing Sheets

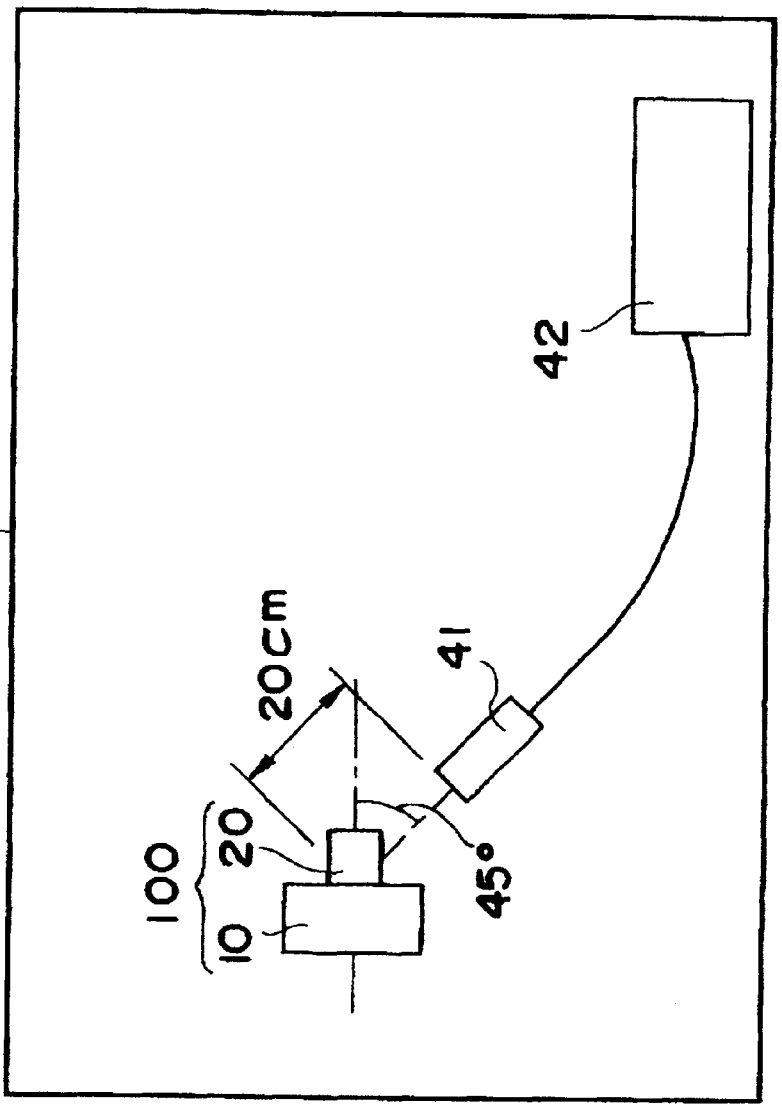

FIG. 4

| GEAR 12 BENDING ELASTIC MODULUS kgf/mm² | GEAR 13 BENDING ELASTIC MODULUS kgf/mm² | EXTENT OF NOISE REDUCTION dB | SENSORY EVALUATION | DRIVING DURABILITY PERFORMANCE ASSESSED AFTER HAVING BEEN DRIVEN 10,000 TIMES OR MORE |
|---|---|---|---|---|
| 10 | 10 | 3~5 | GOOD | ABNORMALITY OCCURRED |
| | 50 | 4~6 | GOOD | NO ABNORMALITY |
| | 100 | 4~6 | GOOD | |
| | 300 | 3~5 | GOOD | |
| | 700 | 2~4 | GOOD | |
| | 1000 | 1~3 | SIGNIFICANT DIFFERENCE | |
| | 1200 | 0 | NO SIGNIFICANT DIFFERNCE | |
| 50 | 10 | 4~6 | GOOD | NO ABNORMALITY |
| | 50 | 5~7 | GOOD | |
| | 100 | 4~6 | GOOD | |
| | 300 | 3~5 | GOOD | |
| | 700 | 2~4 | GOOD | |
| | 1000 | 1~3 | SIGNIFICANT DIFFERENCE | |
| | 1200 | 0 | NO SIGNIFICANT DIFFERNCE | |
| 100 | 10 | 4~6 | GOOD | NO ABNORMALITY |
| | 50 | 4~6 | GOOD | |
| | 100 | 4~6 | GOOD | |
| | 300 | 2~4 | GOOD | |
| | 700 | 2~4 | SIGNIFICANT DIFFERENCE | |
| | 1000 | 1~3 | SIGNIFICANT DIFFERENCE | |
| | 1200 | 0 | NO SIGNIFICANT DIFFERNCE | |
| 300 | 10 | 3~5 | GOOD | NO ABNORMALITY |
| | 50 | 3~5 | GOOD | |
| | 100 | 2~4 | GOOD | |
| | 300 | 0 | NO SIGNIFICANT DIFFERNCE | |
| | 700 | 0 | NO SIGNIFICANT DIFFERNCE | |
| | 1000 | 0 | NO SIGNIFICANT DIFFERNCE | |
| | 1200 | 0 | NO SIGNIFICANT DIFFERNCE | |
| 700 | 10 | 2~4 | GOOD | NO ABNORMALITY |
| | 50 | 2~4 | GOOD | |
| | 100 | 2~4 | SIGNIFICANT DIFFERENCE | |
| | 300 | 0 | NO SIGNIFICANT DIFFERENCE | |
| | 700 | 0 | NO SIGNIFICANT DIFFERENCE | |
| | 1000 | 0 | NO SIGNIFICANT DIFFERENCE | |
| | 1200 | 0 | NO SIGNIFICANT DIFFERNCE | |
| 1000 | 10 | 1~3 | SIGNIFICANT DIFFERENCE | NO ABNORMALITY |
| | 50 | 1~3 | SIGNIFICANT DIFFERENCE | |
| | 100 | 1~3 | SIGNIFICANT DIFFERENCE | |
| | 300 | 0 | NO SIGNIFICANT DIFFERNCE | |
| | 700 | 0 | NO SIGNIFICANT DIFFERNCE | |
| | 1000 | 0 | NO SIGNIFICANT DIFFERNCE | |
| | 1200 | 0 | NO SIGNIFICANT DIFFERNCE | |
| 1200 | 10 | 0 | NO SIGNIFICANT DIFFERNCE | NO ABNORMALITY |
| | 50 | 0 | NO SIGNIFICANT DIFFERNCE | |
| | 100 | 0 | NO SIGNIFICANT DIFFERNCE | |
| | 300 | 0 | NO SIGNIFICANT DIFFERNCE | |
| | 700 | 0 | NO SIGNIFICANT DIFFERNCE | |
| | 1000 | 0 | NO SIGNIFICANT DIFFERNCE | |
| | 1200 | 0 | NO SIGNIFICANT DIFFERNCE | |

FIG. 5

| DUROMETER HARDNESS (TYPE D) | 35 | 40 | 48 | 55 |
|---|---|---|---|---|
| EXTENT OF NOISE REDUCTION (dB) | 4 | 5 | 5 | 4 |

FIG. 6

| DUROMETER HARDNESS (TYPE D) | 45 | 48 | 54 | 60 | 65 |
|---|---|---|---|---|---|
| EXTENT OF NOISE REDUCTION (dB) | 5 | 5 | 4 | 3 | 1 |

DRIVING MECHANISM OF OPTICAL DEVICE

INCORPORATION BY REFERENCE

The disclosures of the following priority applications are herein incorporated by reference:
Japanese Patent Application No. 2001-014395 filed Jan. 23, 2001
Japanese Patent Application No. 2000-016621 filed Jan. 26, 2000.

BACKGROUND OF THE INVENTION

1. Field of the Invention

The present invention relates to a driving mechanism employed in an optical device such as a still camera or a video camera, and more specifically, it relates to a driving mechanism that communicates the driving power generated at a drive source to an object to be driven by utilizing a plurality of gears.

2. Description of the Related Art

Still cameras and video cameras are provided with various types of driving mechanisms including a lens driving mechanism, a film feed mechanism and a tape feed mechanism. These driving mechanisms are normally provided with a motor constituting a drive source and communicates the driving power of the motor to the object to be driven (such as a lens, film or videotape) via a speed-reducing gear train constituted of a plurality of gears. As a result, noise is generated at the gear meshing portions and the shaft rotation supporting portions as well as the motor drive noise during an operation of such a driving mechanism, and the noise can be a problem. Among the various types of noise, the noise occurring at the gear meshing portions, and more specifically the impact noise resulting from the collision of tooth flanks of the gears and the rubbing noise that occurs when the tooth flanks rub against each other, are particularly problematic. The noise tends to sound unusually loud in a quiet environment and irritates people in the vicinity as well as the photographer when the camera or the like is used in a quiet and serious situation.

SUMMARY OF THE INVENTION

An object of the present invention is to provide a driving mechanism of an optical device that achieves a reduction in the noise generated at a gear meshing portion.

In order to achieve the object described above, the driving mechanism of an optical device according to the present invention that communicates the driving force generated at a drive source to an object to be driven includes, at least, a gear having a low bending elastic modulus within the range of 10 kgf/mm$^2$~100 kgf/mm$^2$ manufactured by using at least one of; polyester, polyamide and polyacetals and a gear having a high bending elastic modulus within a range of 50 kgf/mm$^2$~1000 kgf/mm$^2$ manufactured by using at least one of; polyester, polyamide and polyacetals, and the gear having the low bending elastic modulus and the gear having the high bending elastic modulus are meshed with each other.

It is desirable to set the bending elastic modulus of the gear having the high bending elastic modulus within the range of 50 kgf/mm$^2$~700 kgf/mm$^2$ or within the range of 50 kgf/mm$^2$~300 kgf/mm$^2$.

Either the gear having the low bending elastic modulus or the gear having the high bending elastic modulus may mesh with a gear which rotates at the highest speed among the plurality of gears in the driving mechanism. The gear having the low bending elastic modulus may mesh with the gear rotating at the highest speed. The gear having the high bending elastic modulus itself may be a gear rotating at the highest speed among the plurality of gears.

In addition, either the gear having the low bending elastic modulus or the gear having the high bending elastic modulus described above may have a durometer hardness (type D) of 45~55. In such a case, it is preferable to set the durometer hardness (type D) of the gear having the low bending elastic modulus at 40~55 and to set the durometer hardness (type D) of the gear having the high bending elastic modulus at 45~60.

The driving mechanism of an optical device according to the present invention may also achieve the object by including at least a plurality of gears manufactured by using at least one of; polyester, polyamide and polyacetals, and each having a durometer hardness (type D) of 45~55, which mesh with each other. In this driving mechanism, the plurality of gears may include a gear that rotates at the highest speed among the plurality of gears in the driving mechanism or a gear that meshes with the gear rotating at the highest speed.

BRIEF DESCRIPTION OF THE DRAWINGS

FIG. 3 is a plan view illustrating the method adopted to test the noise reduction and the durability in the driving mechanism;

FIG. 4 shows the test results obtained in a first embodiment;

FIG. 5 shows the test results obtained in a second embodiment; and

FIG. 6 shows the test results obtained in the second embodiment.

DESCRIPTION OF THE PREFERRED EMBODIMENTS

First Embodiment

The first embodiment adopting the present invention into a lens driving mechanism of a single lens reflex camera is now explained in reference to FIGS. 1~4.

Figure 1:
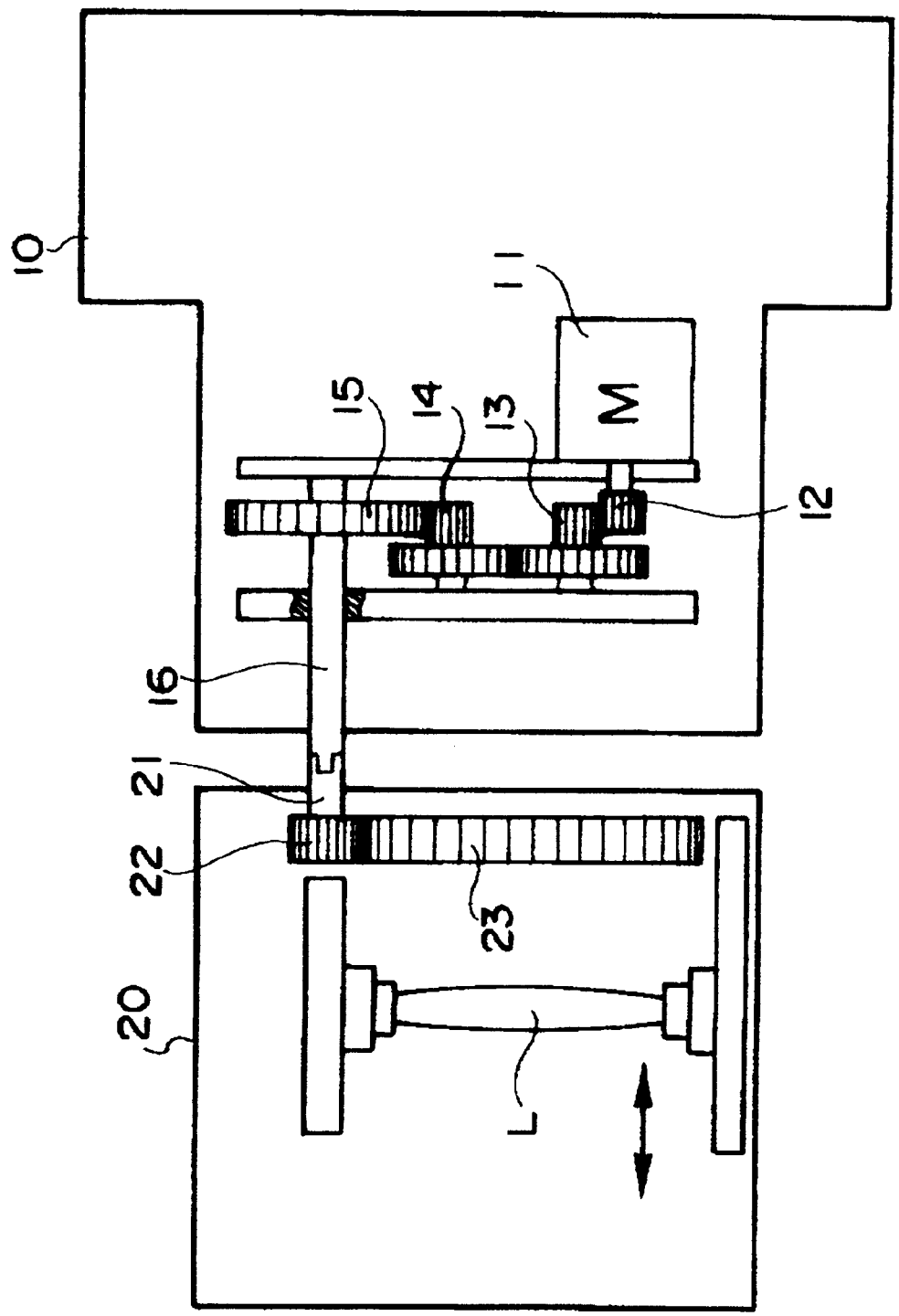
FIG. 1 is a schematic diagram of the driving mechanism of a camera in an embodiment.
Figure 2:
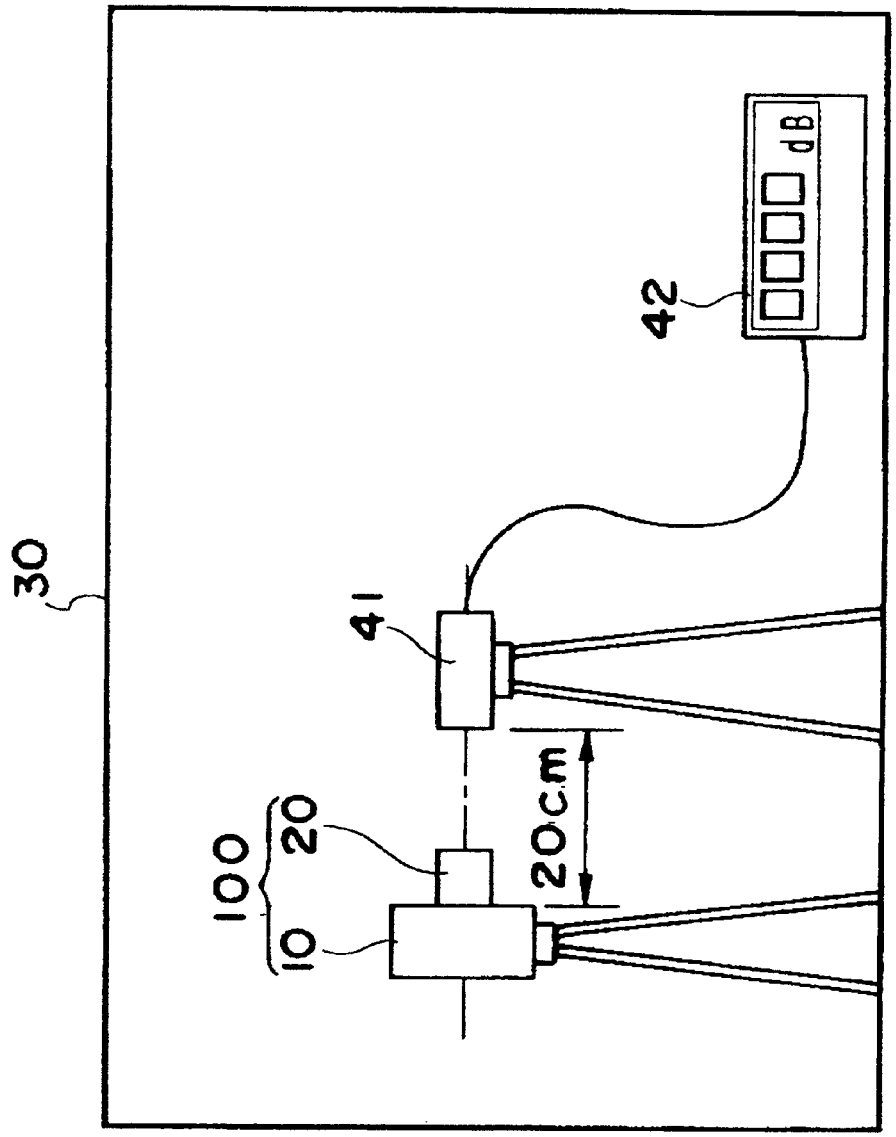
FIG. 2 is a side elevation illustrating a method adopted to test the noise reduction and the durability in the driving mechanism.

FIG. 1 is a schematic diagram of the lens driving mechanism (focusing mechanism) of the camera. The rotation of an AF motor 11 provided at a camera main body 10 is communicated toward a photographic lens 20 via a speed-reducing gear train constituted of a plurality of resinous gears 12~15. The gear 12 that is mounted at the output shaft of the motor 11 meshes with the gear 13 provided at the next stage. The rotation of the motor 11 is slowed down via the gears 12 and 13 and the gears 14 and 15 provided at the subsequent stages and rotates a shaft 16 provided as an integrated part of the gear 15. The shaft 16 is linked with a shaft 21 on the photographic lens side via a coupling, and a gear 22 provided as an integrated part of the shaft 21 meshes with a gear 23. The rotation of the shaft 16 causes the gear 23 to rotate via the shaft 21 and the gear 22, which then causes a focusing optical system L of the photographic lens 20 to travel along the direction of the optical axis (the direction indicated by the arrow) so as to carry out a focal adjustment.

The gear 12 mounted at the output shaft of the motor 11 is the gear rotating at the highest speed among the gears 12~15, 22 and 23 (hereafter referred to as the fastest gear), and its rotational speed is approximately 15,000 rpm. Since the fastest gear 12 rotates at the highest speed, it generates the loudest noise at the portion meshing with the gear 13 of the next stage in the driving mechanism, thus, noise reduction for the entire driving mechanism is most effectively achieved by reducing the noise at that meshing portion. Accordingly, the inventors of the present invention have taken up the fastest gear 12 and the gear 13 meshing with the gear 12 (one of them is the gear having the high bending elastic modulus and the other is the gear having the low bending elastic modulus) and conducted tests with respect to the noise reduction and the durability using the gears formed so as to achieve various bending elastic modulus with various materials as the gears 12 and 13. The tests were conducted by placing a camera 100 in a soundproof chamber, placing a microphone 41 at a position achieving an angle of approximately 45° relative to the optical axis of the photographic lens 20 and a distance of 20 cm from the front surface of the camera main body and measuring the noise generated during an operation of the driving mechanism with a sound level meter 42. It is to be noted that the gears other than the gears 12 and 13 were constituted of conventional materials.

FIG. 4 presents the results of the tests. In the reference example provided for comparison, the gear 12 was constituted of PBT (polybutylene terephthalate) having a bending elastic modulus of 1000 kgf/mm$^2$ and the gear 13 was constituted of a polyacetals material having a bending elastic modulus of approximately 500 kgf/mm$^2$. This is a conventional standard combination. The term "extent of noise reduction" in the table indicates that noise reduction is achieved with the specific extent in units of dB of the A-weighted sound pressure level compared to the reference example (hereafter, dB always indicates the A-weighted sound pressure level). As shown in FIG. 4, no noise reduction effect is achieved once the bending elastic modulus of either the gear 12 or the gear 13 exceeds 1200 kgf/mm$^2$.

When one of the gears has a bending elastic modulus of 1000 kgf/mm$^2$, a slight noise reduction effect is achieved compared to the reference example as long as the bending elastic modulus of the other gear is within the range of 10~100 kgf/mm$^2$. However, the noise is reduced only to a small degree, by approximately 1~3 dB. When the bending elastic modulus of one of the gears is 700 kgf/mm$^2$, a noise reduction effect is also achieved if the other gear has a bending elastic modulus of 10~100 kgf/mm$^2$. The noise is reduced to a greater extent than the preceding case, by approximately 2~4 dB. A noise reduction of 3~5 dB is obtained and thus, the noise reduction effect is further improved in the combination of one gear having a bending elastic modulus of 300 kgf/mm$^2$ and the other gear having a bending elastic modulus of 10~50 kgf/mm$^2$. The lower the bending elastic modulus of both gears become, the higher the noise reduction effect is.

While the noise generated at the gear meshing portion includes the impact noise resulting from a collision of the tooth flanks of the gears and the rubbing noise which occurs when the tooth flanks rub against each other, lower bending elastic modulus are considered to contribute to a reduction in the impact noise. In other words, by constituting at least one of the two gears with a material having a low bending elastic modulus, the impact of the tooth flanks colliding against each other is absorbed to suppress the generation of noise.

The inventors of the present invention considered various materials and concluded that polyester materials, polyamide materials and polyacetals materials, in particular, may form a high accuracy gear while having a low bending elastic modulus and are highly effective in reducing noise. While the lower limit to the bending elastic modulus is normally considered to be JIS class 6~class 7, polyester materials, polyamide materials and polyacetals materials achieve bending elasticity that is equivalent to JIS class 3~class 4. In addition, it was learned that while polyurethane materials also allow formation of gears with low bending elasticity, they do not achieve good forming accuracy and are not effective in reducing noise.

The tests included a sensory evaluation (evaluation of the ease on the ear) compiled by having a plurality of subjects listen to the noise. The results presented in FIG. 4 indicate that the greater the extent of noise reduction, the greater change occurs in the quality of the noise. "good" indicates that 80% or more of the subjects answered that the sound quality was clearly improved over the reference example.

While it became obvious that the noise reduction effect is improved as the bending elastic modulus of the gears are lowered, the durability of the product must be taken into consideration since the strength is reduced as the bending elastic modulus are lowered. The "driving durability performance" in FIG. 4 indicates the presence/absence of abnormality manifesting when the mechanism was driven 10,000 times or more. Through the tests, it was revealed that when the bending elastic modulus of both gears 12 and 13 were at 10 kgf/mm$^2$ abnormality manifested, and neither the durability or the accuracy of the parts of the molded products satisfied the product standard. In addition, although not included in the results presented in FIG. 4, it was also learned that when the bending elastic modulus of one of the gears was 5 kgf/mm$^2$ or lower, the durability became poor regardless of the bending elastic modulus of the other gear. However, even when the bending elastic modulus of one of the gears is at 10 kgf/mm$^2$, no problem related to the durability was observed as long as the bending elastic modulus of the other gear was 50 kgf/mm$^2$ or higher. Furthermore, the durability tends to be improved by forming the high-speed gear 12 of the two gears 12 and 13 with a material having a high bending elastic modulus.

When the two factors, i.e., the noise reduction and the durability, are considered from the above perspective, it may be concluded that of the gears 12 and 13, the gear having the low bending elastic modulus should achieve a bending elastic modulus set to 10 kgf/mm$^2$ or higher and 100 kgf/mm$^2$ or lower and the gear having the high bending elastic modulus that meshes with the other gear should achieve a bending elastic modulus of 50 kgf/mm or higher and 1000 kgf/mm$^2$ or lower. In addition, an improvement in the noise reduction effect is achieved by setting the bending elastic modulus of the gear having the high bending elastic modulus to 50 kgf/mm$^2$~700 kgf/mm$^2$ and a further improvement is achieved by setting the bending elastic modulus of the gear having the high bending elastic modulus to 50 kgf/mm$^2$~300 kgf/mm$^2$. Moreover, by setting the bending elastic modulus of the gear 12 that rotates at high speed higher than the bending elastic modulus of the gear 13, the durability is further improved.

In an example in which the gear 12 was constituted by using a polyacetals (POM) material having a bending elastic modulus of 300 kgf/mm$^2$ and the gear 13 was constituted by using a polyester material having a bending elastic modulus of 50 kgf/mm$^2$, the total sound pressure was reduced by as much as 5 dB compared to the reference example described above. In addition, by constituting the gear 12 with the polyacetals (POM) material having a bending elastic modulus of 300 kgf/mm$^2$ as in the example described above and constituting the gear 13 with a polyamide material having a bending elastic modulus of 20 kgf/mm$^2$, too, the total sound pressure was reduced by as much as 5 dB compared to the reference example. Although FIG. 4 only presents data obtained by measuring the total sound pressure, further tests were conducted with respect to noise in the high frequency band of 1 KHZ or higher which is most jarring to the ear. The results of these tests show that either of the material combinations described above achieved noise reduction by 10 dB or more. In the sensory evaluation, 80% or more of the subjects answered that the sound quality was improved compared to the reference example. This is considered to be attributable to the noise reduction achieved in the high frequency band. The degree of durability achieved in both cases met the camera operating specifications with ample margin.

In another example, the total sound pressure was further reduced by 1 dB, i.e., a noise reduction of 6 dB compared to the reference example was achieved, by constituting the gear 12 achieving a bending elastic modulus of 50 kgf/mm$^2$ with the polyacetals material and constituting the gear 13 with a polyamide material having a bending elastic modulus of 10 kgf/mm$^2$ instead of the polyester material. In this case, too, a noise reduction was achieved in the high frequency range of 1 KHz or higher by 10 dB or more as in the examples explained earlier.

Some differences are observed among various materials with respect to the degree of noise reduction achieved at the gear meshing portion. While the polyacetals material and the polyester material both achieve a great noise reduction effect, the polyacetals material, in particular, is considered to contribute to a reduction in the rubbing noise caused by the tooth flanks rubbing against each other and a reduction in the rubbing noise occurring at the shaft rotation supporting portion because of its high lubricity. Thus, by constituting a gear with a polyacetals material having a low bending elastic modulus, both the impact noise and the rubbing noise can be reduced. In addition, as the polyester material and the polyamide material are considered to be particularly effective in reducing the impact noise, it is possible to reduce both the impact noise and the rubbing noise by selecting a polyester material or a polyamide material achieving a high degree of lubricity.

Second Embodiment

While specific materials are selected to constitute the gears achieving specific bending elastic modulus, the gears are formed by also taking into consideration the varying degrees of hardness of the materials in the second embodiment described below.

Under normal circumstances, the hardness of a gear may change depending upon the conditions under which it is formed, and if the allowable range of hardness is narrowed, a reduction in the yield factor is bound to occur. Accordingly, the inventors of the present invention prepared gears achieving varying degrees of hardness by varying the conditions under which they were formed such as the forming temperature and the forming pressure, each to constitute the fastest gear 12 having a bending elastic modulus of 10 kgf/mm$^2$, which achieved good results in the bending elastic modulus tests described above, and measured the extent to which noise reduction was achieved by the individual gears.

FIG. 5 presents the test results. The degrees of hardness of the gears are expressed as durometer hardness (type D: JIS K 6253). The results presented in the table indicate that as long as the bending elastic modulus is approximately 10 kgf/mm$^2$, roughly equal degrees of noise reduction effect are achieved regardless of the hardness. However, the gears having a durometer hardness of under 40 showed poor durability. It is to be noted that gears having a durometer hardness factor exceeding 55 could not be prepared even by adjusting the forming conditions.

Thus, the allowable durometer hardness range of the gear 12 having a bending elastic modulus of 10 kgf/mm$^2$ should be 40 or higher and 55 or lower, to achieve the optimal balance between the noise reduction and the durability.

Next, the inventors of the present invention prepared gears having varying degrees of hardness to constitute the gear 13 having the bending elastic modulus of 700 kgf/mm$^2$ which achieved good results in the tests described earlier, and measured the extent of noise reduction achieved by the individual gears, which produced the test results presented in FIG. 6.

As indicated in FIG. 6, when the bending elastic modulus is approximately 700 kgf/mm$^2$, the noise reduction effect tends to improve as the durometer hardness becomes lower. It is to be noted that gears having a durometer hardness of less than 45 could not be manufactured even by adjusting the forming conditions.

Thus, it was learned that a relatively high noise reduction effect can be achieved by forming the gear 13 having the bending elastic modulus of 700 kgf/mm$^2$ by ensuring that the gear has a durometer hardness of 45 or higher and 60 or lower.

As explained above, by ensuring that at least either of the gears achieves a durometer hardness (type D) of 45 or higher and 55 or lower, a marked noise reduction effect is achieved.

It is to be noted that while the explanation given above focuses on the fastest gear and the gear that meshes with the fastest gear, either of the gear having the low bending elastic modulus within a range of 10 kgf/mm$^2$~100 kgf/mm$^2$ and the gear having the high bending elastic modulus within the range of 50 kgf/mm$^2$~1000 kgf/mm$^2$ meshing with each other may mesh with the fastest gear, instead. In addition, the combination of another gear comprised in the gear train, which is constituted of the gear having the low bending elastic modulus of 10 kgf/mm$^2$~100 kgf/mm$^2$ and the gear having the high bending elastic modulus of 50 kgf/mm$^2$~1000 kgf/mm$^2$ meshing with the gear having the lower bending elastic modulus is also expected to achieve good noise reduction.

Furthermore, a noise reduction effect is realized by forming each of the meshing gears with at least one of the materials listed earlier (polyester, polyamide and polyacetals) achieving a durometer hardness (type D) of 45~55, regardless of their bending elastic modulus. By assigning either one of the meshing gears as the gear that rotates at the highest speed or the gear that meshes with the fastest gear, an improvement in the noise reduction effect is realized.

While an explanation is given above on an example in which the present invention is adopted in a driving mechanism employed in AF drive, the present invention may also be adopted in a driving mechanisms employed zoom for drive or film feed. In addition, the present invention may be adopted in various types of driving mechanisms employed in lens shutter cameras, digital still cameras and video cameras, as well as those utilized in single lens reflex cameras. In an application in a video camera, the present invention may be adopted in a driving mechanism employed in videotape feed as well as in the AF driving mechanism and the zoom driving mechanism.

What is claimed is:

1. A driving mechanism of an optical device that communicates a driving force generated at a drive source to an object to be driven, comprising, at least;

a gear having a low bending elastic modulus set within the range of 10 kgf/mm$^2$–100 kgf/mm$^2$, that is constituted by using at least one of; polyester, polyamide and polyacetals; and a gear having a high bending elastic modulus set within a range of 50 kgf/mm$^2$–1000 kgf/mm$^2$, that is constituted by using at least one of; polyester, polyamide and polyacetals, wherein;

said gear having the low bending elastic modulus and said gear having the high bending elastic modulus mesh with each other while the bending elastic modulus of said gear having the high bending elastic modulus is higher than that of said gear having the low bending elastic modulus, and either of said gear having the low bending elastic modulus and said gear having the high bending elastic modulus meshes with the gear that rotates at the highest speed among a plurality of gears in said driving mechanism.

2. A driving mechanism of an optical device according to claim 1, wherein;

the bending elastic modulus of said gear having the high bending elastic modulus is within the range of 50 kgf/mm$^2$~700 kgf/mm$^2$.

3. A driving mechanism of an optical device according to claim 1, wherein;

the bending elastic modulus of said gear having the high bending elastic modulus is within the range of 50 kgf/mm$^2$~300 kgf/mm$^2$.

4. A driving mechanism of an optical device according to claim 1, wherein;

said gear having the high bending elastic modulus is said gear that rotates at the highest speed.

5. A driving mechanism of an optical device according to claim 1, wherein;

either of said gear having the low bending elastic modulus and said gear having the high bending elastic modulus achieves a durometer hardness (type D) of 45~55.

6. A driving mechanism of an optical device according to claim 1, wherein;

said gear having the low bending elastic modulus achieves a durometer hardness (type D) of 40~55 and said gear having the high bending elastic modulus achieves a durometer hardness (type D) of 45~60.

* * * * *